No. 823,144. PATENTED JUNE 12, 1906.
W. R. SUMMERS.
ATTACHMENT FOR HARROWS.
APPLICATION FILED JAN. 25, 1906.
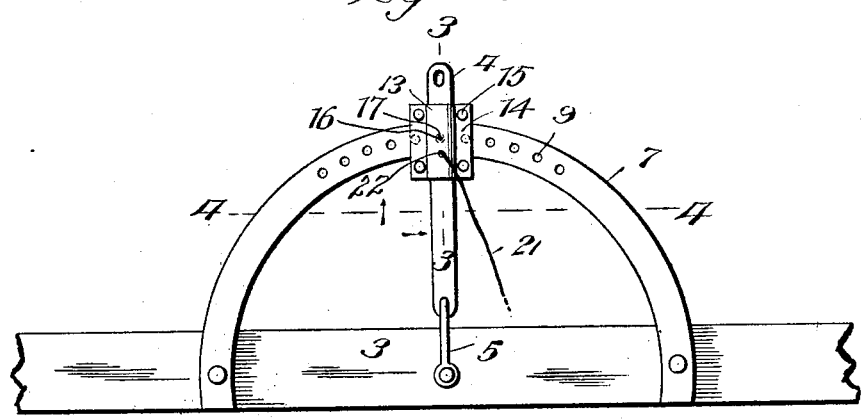
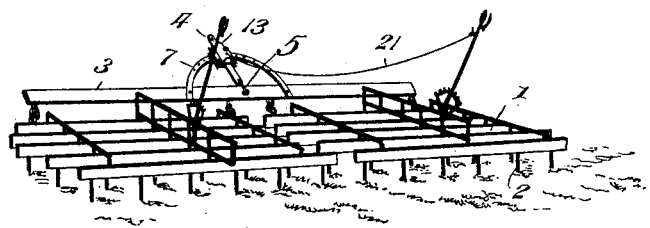
Inventor
W. R. Summers.
Witnesses

UNITED STATES PATENT OFFICE.

WARREN R. SUMMERS, OF GEORGETOWN, INDIANA.

ATTACHMENT FOR HARROWS.

No. 823,144.

Specification of Letters Patent.

Patented June 12, 1906.

Application filed January 25, 1906. Serial No. 297,824.

*To all whom it may concern:*

Be it known that I, WARREN R. SUMMERS, a citizen of the United States, residing at Georgetown, in the county of Floyd and State of Indiana, have invented certain new and useful Improvements in Attachments for Harrows; and I do hereby declare the following to be a full, clear, and exact description of the invention, such as will enable others skilled in the art to which it appertains to make and use the same.

My invention relates to draft attachments for harrows; and its object is to provide a device of this character which is capable of being quickly adjusted so as to shift the line of draft to any desired angle in relation to the longitudinal center of the harrow, thereby enabling the operator to prevent the rear end of the harrow from swinging out of line when being drawn over an inclined surface, such as a hillside.

A great objection heretofore experienced in the use of a harrow has been the tendency of the end thereof to swing or slide laterally down an inclined surface, thereby causing the teeth thereon to move forward in alinement instead of out of alinement.

My invention consists of a novel arrangement of devices whereby the operator can quickly shift the harrow-body in its relation to the draft-animals, so that the line of draft will be at an angle to the longitudinal center of the harrow, and therefore said harrow cannot sag so that its teeth will move out of proper position in relation to the direction of the movement.

The invention also consists of the further novel features of construction and combination of parts, the preferred form whereof will be hereinafter made clearly apparent, reference being had to the accompanying drawings, which are made a part of this application, and in which—

Figure 1 is a perspective view of a harrow having my improved attachment connected thereto. Fig. 2 is an enlarged plan view of the attachment. Fig. 3 is a section on line 3 3, Fig. 2. Fig. 4 is a section on line 4 4, Fig. 2, and Fig. 5 is a section on line 5 5, Fig. 4.

Referring to the figures by numerals of reference, 1 is the body of a harrow having teeth 2 of any desired construction and provided with a front bar 3 at its forward end. A draft-bar 4 is secured to the center of bar 3 by means of a link 5, and this draft-bar has an opening 6 therein, which is disposed above a substantially semicircular supporting-bar 7, which is concentric with the point of connection of link 5 with bar 3. A bracket 8 is fastened to the lower surface of bar 4 and extends under the opening 6. This bracket also extends under the supporting-bar 7 and is adapted to slide thereunder. A series of openings 9 are formed within the supporting-bar 7 and are adapted to be brought successively into registration with the opening 6. A bottom plate 10 is disposed under and in contact with the bracket 8, and a top plate 11 is located on top of the draft-bar 4, said top plate 11 having an opening 12 therein, which registers with the opening 6. A cap 13 in the form of a U-shaped plate, having lateral flanges 14, is disposed upon top plate 11 and is fastened thereto by means of bolts 15, which also extend downward through the bottom plate 10 and at opposite sides of the draft-bar 4 and supporting-bar 7. The cap 13 is provided at its center with an opening 16, in which is slidably mounted a stem 17, projecting upward from a locking-pin 18, which is normally held seated within the openings 12, 6, and 9 by means of a coiled spring 19, which is interposed between the pin 18 and the upper portion of the cap 13 and surrounds stem 17. A lug 20 extends laterally from pin 18, and a cord 21 is fastened to it and projects through an opening 22 in cap 13 to any point where it can be conveniently grasped by the operator. The bolts 15 are preferably provided with sleeves 23, which are interposed between the top and bottom plates 11 and 10 and prevent binding of the bars 4 and 7.

It will be understood that when the harrow is being pulled along level ground the draft-bar 4 is secured in alinement with the longitudinal center of the harrow, it being held in such position by the pin 18 engaging the proper opening 9 in bar 7. Should the rear portion of the harrow sag to one side when the device is drawn over an incline, the operator can quickly shift the line of draft in relation to the longitudinal center of the harrow by pulling the cord 21, so as to raise the pin 18 and release the bar 7 therefrom. The harrow can then be pushed laterally until it assumes a desired angle to the line of draft, whereupon the cord 21 can be released and the pin will spring into engagement with the nearest opening 9, and thereby lock the parts in adjusted position. The harrow can then be drawn over the incline and the teeth thereof will be maintained in proper relation to the direction of movement and will not move into position one behind the other.

The attachment can be very readily attached to any form of harrow and will be found to be of great utility.

What I claim is—

1. An attachment for harrows comprising a pivoted draft-bar, a bracket secured thereunder, a top and a bottom plate secured above the draft-bar and below the bracket respectively, a cap secured upon the top plate, an apertured supporting-bar extending under the draft-bar and within the bracket, said supporting-bar having a series of apertures therein, and a spring-pressed locking device mounted within the cap and draft-bar and adapted to be seated in any aperture in the supporting-bar.

2. An attachment for harrows comprising a pivoted draft-bar, a bracket secured thereunder, a top and a bottom plate secured above the draft-bar and below the bracket respectively, a cap secured upon the top plate, an apertured supporting-bar extending under the draft-bar and within the bracket, said supporting-bar having a series of apertures therein, a spring-pressed locking-pin slidably mounted within the cap and draft-bar and adapted to be seated in any of the apertures in the supporting-bar, and a flexible actuating-cord connected to the pin and extending from the cap.

In testimony whereof I have signed my name to this specification in the presence of two subscribing witnesses.

WARREN R. SUMMERS.

Witnesses:
J. A. WRIGHT,
O. W. BYERLEY.